Sept. 4, 1951 W. H. WORK 2,566,816
EXPANSIBLE PLUG CLOSURE
Filed Oct. 20, 1948
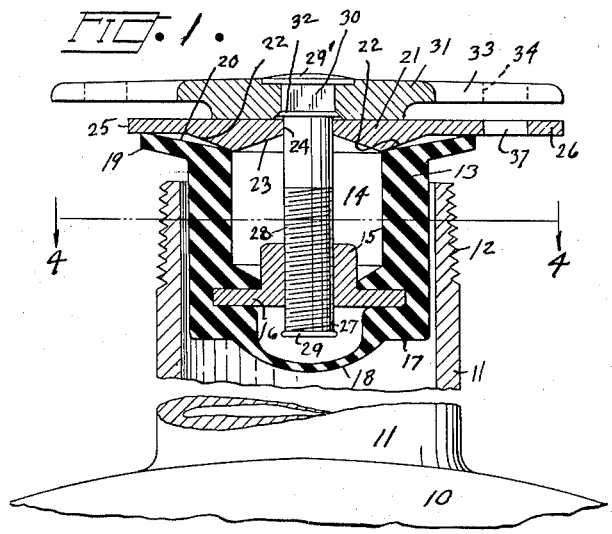
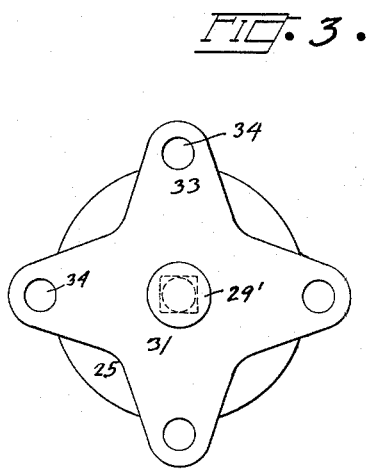
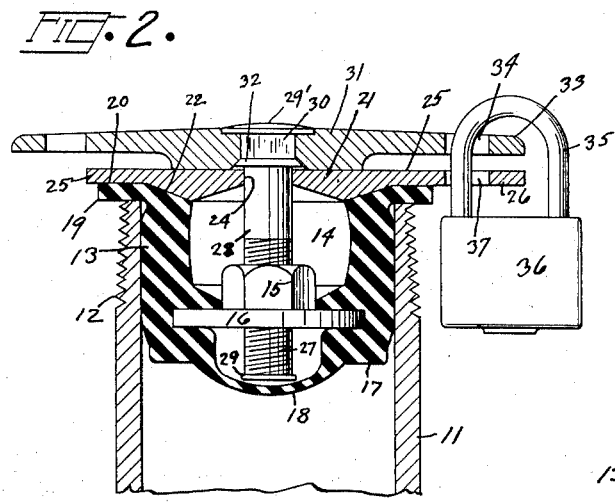
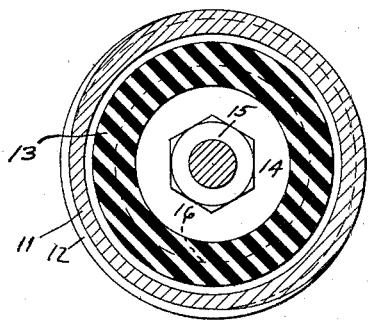
INVENTOR
WORTH H. WORK.
BY
ATTORNEY Patented Sept. 4, 1951

2,566,816

UNITED STATES PATENT OFFICE 2,566,816

EXPANSIBLE PLUG CLOSURE

Worth H. Work, Portland, Oreg.

Application October 20, 1948, Serial No. 55,463

1 Claim. (Cl. 220—24.5)

This invention relates generally to closures and particularly to a closure for filler pipes.

The main object of this invention is to provide a closure of the class described which can be easily manufactured and which can hermetically seal a filler pipe opening when not in use.

The second object is to so construct the device so that it can be applied or removed without the use of tools.

The third object is to so construct the device that, although it cannot become rusted shut, it can be locked by means of a key to prevent the unauthorized removal thereof.

I accomplish these and other objects in the manner set forth in the following specification as illustrated by the accompanying drawing, in which:

Fig. 1 is a section through the device showing it being inserted into a filler pipe which is shown in fragmentary section.

Fig. 2 is a section showing the closure locked in place.

Fig. 3 is a plan view of the device.

Fig. 4 is a section taken along the line 4—4 in Fig. 1.

Like numbers of reference refer to the same or similar parts throughout the several views.

Referring in detail to the drawing, there is shown a portion of an oil tank 10 which is normally underground. The tank 10 is provided with a filler pipe 11 whose upper end is provided with a thread 12, upon which is screwed a cap (not shown). Such caps require a wrench to apply or remove and if not tightened will permit water from snow or flooding to enter the pipe 11. Also, if not tightened, they encourage the improper removal of the caps.

When my device is used, the ordinary filler pipe cap is dispensed with.

Referring particularly to my invention, it will be seen to consist of a cylindrical rubber or artificial rubber plug 13 which is small enough to slip down freely into the upper end of the filler pipe 11.

The plug 13 has formed in its upper end a cylindrical cavity 14, in the lower end of which is mounted a nut 15 having a flange 16 integral therewith, which flange is embedded in the rubber plug 13 and is not rotatable with relation thereto. The lower end 17 of the plug 13 is closed by a thin wall 18. A flange 19 is formed around the upper end of the plug 13 and is intended to rest on the upper end of the pipe 11. The top face 20 of the plug 13, as well as the flange 19, slopes as shown in Fig. 1.

On the plug 13 is placed a metal washer 21 having a plug spreading face 22 which is inclined slightly more than is the plug face 20. The central portion 23 is sloped toward the round central opening 24. The outer rim 25 is normal to the axis of the plug and has a perforated projecting lug 26 formed thereon.

Extending through the nut 15 is the threaded end 27 of a screw 28 whose end 29 is headed to prevent its withdrawal from the nut 15. The screw 28 passes through the opening 24 in the washer 21. Under the head 29' is formed a square shoulder 30 on which is placed a hand wheel 31 which is secured by the flange rivet 32.

The wheel 31 has four arms 33 which are provided with holes 34 which receive the hasps 25 of the padlock 36.

In the operation of the device it is only necessary to insert it into the pipe 11 as shown in Fig. 1 and then, by rotating the wheel 31, compress the cylinder 13 until it expands as shown in Fig. 2. After this, the padlock 36 is inserted and the device is held against further movement.

It will be understood that the hasp 35 passes through the hole 34 in the wheel 31 and through the hole 37 in the lug 26.

It will be remembered that in existing installations, a large proportion of the pipe threads are corroded or worn to a point where it is impossible to screw a cap on securely enough to hold out water or foreign matter. The only remedy for this is the re-threading of the fill pipe which, under average conditions, would be an expensive operation. By the use of my device, all such difficulties are avoided.

I claim:

A closure for filler pipes on oil storage tanks comprising a cylindrical resilient plug having a large central recess formed therein extending along the major portion of its length, closed at one end having the other end flared outwardly to form a flange, a nut having a flange imbedded in said closed end, a spreading washer engaging said flanged end, the under side of said spreading washer having an annular ring formed thereon, the two sides of which slope downwardly, the outer side of which slopes more than does the sloping portion of the plug flange, said outer sloping side covering the wall of said plug, the outermost portion of the spreading washer lying in a plane normal to the plug axis, said washer having a perforated lug projecting from its rim, a hand wheel resting on said washer having a screw secured therein passing through said spreading washer and nut into space between said nut and the closed end of the plug, the ends of said screw having a head within said space, said hand wheel having perforated spokes registering with the perforation in said washer lug and a padlock passing through said spokes and washer lug.

WORTH H. WORK.

REFERENCES CITED

The following references are of record in the file of this patent:

UNITED STATES PATENTS

| Number | Name | Date |
|---|---|---|
| 624,363 | Moore, Jr. | May 2, 1899 |
| 1,065,896 | Carter | June 24, 1913 |
| 1,506,418 | Evensta et al. | Aug. 26, 1924 |
| 1,555,759 | Rowe | Sept. 29, 1925 |
| 1,597,068 | Donald et al. | Aug. 24, 1926 |
| 1,702,532 | Boomer et al. | Feb. 19, 1929 |
| 2,214,732 | Kraft | Sept. 17, 1940 |
| 2,312,738 | Ulanet | Mar. 2, 1943 |
| 2,439,628 | Kopecky | Apr. 13, 1948 |